United States Patent
Fischer (12)

(10) Patent No.: US 6,470,387 B1
(45) Date of Patent: Oct. 22, 2002

(54) LOCATING NETWORKED DEVICES BASED ON USAGE

(75) Inventor: Todd A. Fischer, Boise, ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/268,241

(22) Filed: Mar. 15, 1999

(51) Int. Cl.[7] .............................................. G06F 15/173
(52) U.S. Cl. ...................................................... 709/224
(58) Field of Search ................................ 709/224, 225, 709/229, 231, 245; 707/10

(56) References Cited

U.S. PATENT DOCUMENTS

| | | | | |
|---|---|---|---|---|
| 5,185,860 A | * | 2/1993 | Wu | 709/224 |
| 5,745,682 A | * | 4/1998 | Keenan | 395/200.5 |
| 5,793,974 A | * | 8/1998 | Messinger | 395/200.54 |
| 5,852,722 A | * | 12/1998 | Hamilton | 395/200.51 |
| 5,862,339 A | * | 1/1999 | Bonnaure et al. | 395/200.57 |
| 5,878,420 A | * | 3/1999 | de la Salle | 707/10 |
| 6,115,754 A | * | 9/2000 | Landgren | 709/249 |
| 6,125,446 A | * | 9/2000 | Olarig et al. | 713/200 |
| 6,272,541 B1 | * | 8/2001 | Cromer et al. | 709/224 |
| 6,304,899 B1 | * | 10/2001 | Cromer et al. | 709/217 |

* cited by examiner

*Primary Examiner*—Dung C. Dinh
*Assistant Examiner*—Tod A Kupstas
(74) *Attorney, Agent, or Firm*—Lane R. Simmons (57) ABSTRACT

A tool for locating a device on a network includes software for capturing information from the network or from devices on the network. The captured information includes user information relating to a user or users that use the device being located. The captured user information is cross referenced with a database having user location information. The user location information is then referenced to determine a physical location of the device. Typically, the physical location of the device is in the same general area as its users.

14 Claims, 4 Drawing Sheets

LOCATING NETWORKED DEVICES BASED ON USAGE

FIELD OF THE INVENTION

This invention relates in general to networked devices and, more particularly, to locating networked devices based on user usage of those devices.

BACKGROUND OF THE INVENTION

There are many advantages to connecting computing equipment, such as personal computers, workstations, servers, printers, scanners, modems, facsimile machines, copiers, cameras and the like, to a network. In fact, local area networks, wide area networks, and even networks connecting with the Internet are now deemed common and even necessary for many business communications environments. However, one challenge with network connected devices in large environments or extensive business facilities is locating those devices for asset tracking or maintenance purposes.

Typically, asset tracking of networked devices has only been performed manually. Namely, someone must physically traverse the network or possible locations where each device may reside to determine the serial number or asset number and the actual location of each device, and/or to perform any required maintenance thereon. In large companies, where facilities may be extensive and widely distributed, this process can be very tedious and time consuming.

However, other schemes have been proposed that attempt to capitalize on existing communications technologies. For example, in one scheme, all devices are equipped with a receiver that causes the device to identify itself when a signal is received. A low powered transmitter is moved through out the complex where the networked devices are presumably located. When the receiver identifies itself, the location of the transmitter is used to give the approximate location of the asset identifying itself. Another approach is to equip each networked device with a global positioning system (GPS) receiver. GPS equipped assets are then interrogated to learn their location. However, these approaches require additional and often expensive components for the networked devices.

Accordingly, an object of the present invention is to provide a tool and method for locating networked devices.

SUMMARY OF THE INVENTION

According to principles of the present invention in a preferred embodiment, a tool for locating a device on a network includes software for capturing information from the network or from devices on the network. The captured information includes user information relating to a user or users that use or reference the device being located. The captured user information is cross referenced with a database having user location information. The user location information is then referenced to determine a physical location of the device. Typically, the physical location of the device is in the same general area as its users.

A preferred method of locating a device on a network includes identifying user information pertaining to a user or users that use or have used the device; determining a reference location of the user or users based on the user information; and determining a location of the device based on the reference location of the user or users.

Other objects, advantages, and capabilities of the present invention will become more apparent as the description proceeds.

DETAILED DESCRIPTION OF THE INVENTION

Figure 1:
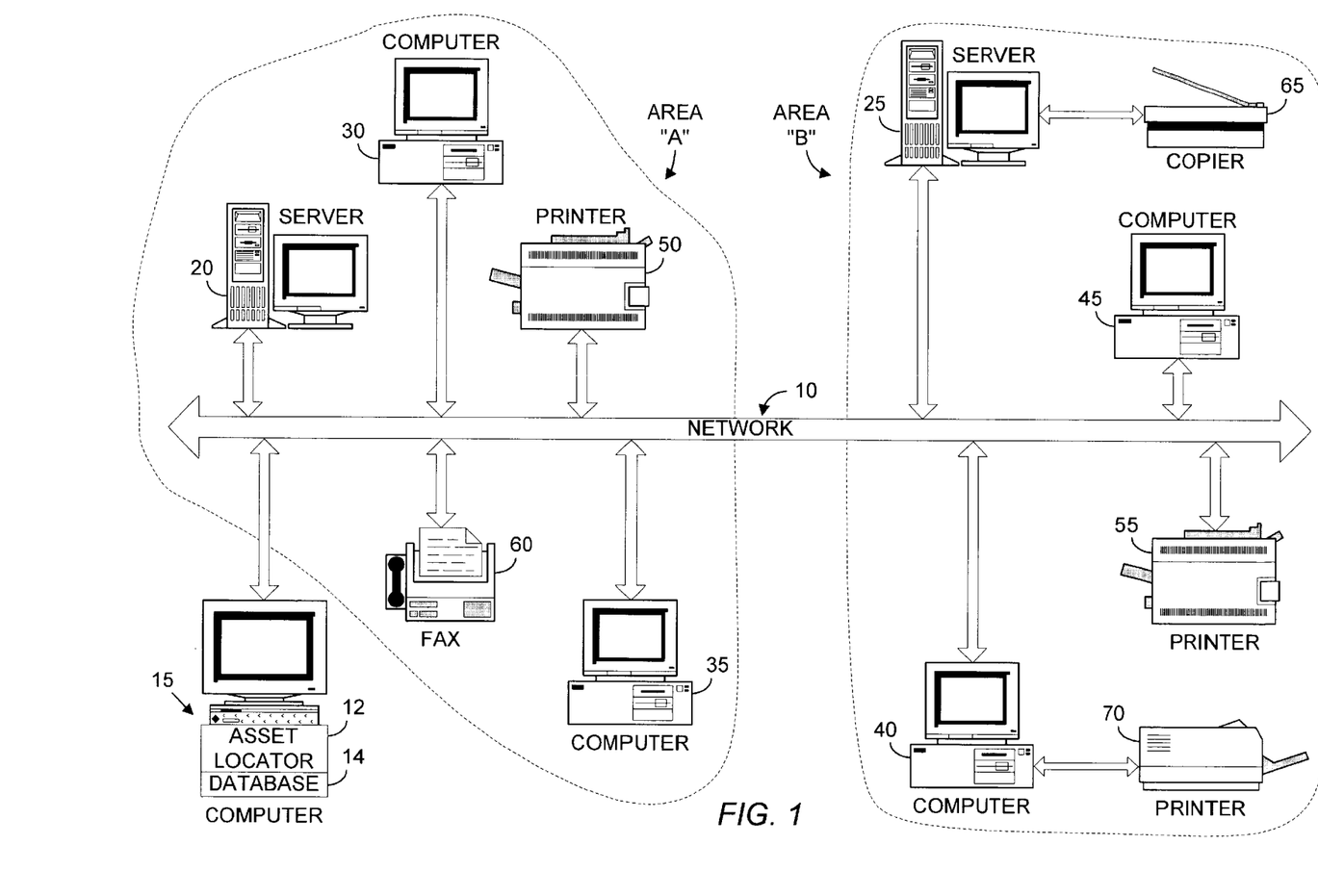
FIG. 1 is a schematic diagram of a network and networked devices including the present invention asset locator.

FIG. 1 is a schematic diagram of a communication network 10 including the present invention asset locator 12 embodied in computer 15. Network 10 is any conventional communication network such as one employing the Transmission Control Protocol/Internet Protocol (TCP/IP) or Internet Packet Exchange (IPX) protocol for communication between devices coupled to the network. Network 10 may be a local area network, wide area network, plurality of interconnected networks, or even the internet. Network 10 includes a plurality of devices communicating thereon that are directly coupled to the network, including asset locator computer 15, servers 20 and 25, personal computers 30, 35, 40 and 45, printers 50 and 55, and fax machine 60. Copier 65 is directly coupled to server 25 and, thus, indirectly coupled to network 10. Similarly, printer 70 is directly coupled to computer 40 and, thus, indirectly coupled to network 10.

Clearly, FIG. 1 depicts only an exemplary configuration of devices coupled to network 10, and is also merely exemplary of conventional devices that can be coupled to network 10 under principles of the present invention. Each device coupled to network 10, either directly or indirectly, is coupled using a hard wired connection, an infrared connection, radio frequency connection or other conventional coupling technology.

Server (host) 20 is a computing device that "serves" the network in a conventional manner. Namely, in the example discussed herein and shown, server 20 offers services like file and print services for computers 30 and 35, printer 50, and fax machine 60. To this regard, server 20 provides the queuing and spooling capabilities for enabling users at personal computers 30 and 35 to send print jobs to network printer 50 and/or exchange fax jobs with fax machine 60. For example, if a user at computer 30 desires to send a print job to printer 50, the job is first transmitted from computer 30 to server 20 via network 10, and then server 20 spools the job over to printer 50 also via network 10.

Server (host) 25 is also a computing device that "serves" the network in a conventional manner. Namely, in the example discussed herein and shown, server 25 offers services for computers 40 and 45, and copier machine 65. To this regard, server 25 provides the queuing and spooling capabilities for enabling users at personal computers 40 and 45 to send print/copy jobs to copier machine 65. Since copier 65 is directly coupled to server 25 (and thus indirectly coupled to network 10), if a user at computer 40 or 45 desires to send a copy job to copier 65, then the job is first transmitted from the respective computer to server 25 via network 10, and then server 25 spools the job directly to copier 65 without transmitting the job back onto network 10. Server 25 also receives copy jobs directly from copier 65 and forwards those jobs via network 10 to computers 40 and 45 as directed by the copier or requested by those computers.

Printer 70 is directly coupled to host computer 40. But, in this example, computer 40 is configured to not allow printer 70 to be accessed by other devices on network 10. Thus, only a user at computer 40 is able to transmit a print job to printer 70. No other devices on network 10 can transmit to printer 70.

Printer 55 is a standalone network printer that includes its own internal networking card for enabling networking capabilities. Thus, printer 55 is not served by any other server device 20 or 25. As such, when a user submits a print job from computer 40 or 45, for example, the job is directed over network 10 directly to network printer 55 without being routed through any server.

Asset locator computer 15 represents a computer having memory, storage, processing and networking technologies as conventional in the art, as well as the specific asset locator software 12 of the present invention. Although in a preferred embodiment the present invention asset locator 12 is embodied in software stored on computer 15, it is similarly feasible to be embodied in firmware or "hardwired" in circuitry on computer 15. Additionally, although the present invention asset locator 12 is described in association with computer 15 on network 10, it is understood that asset locator 12 may similarly reside on other networked computing devices such as server 20 or 25, printer 55, or computer 30, 35, 40 or 45, or may reside on a plurality of devices in a distributed context. For example, database 14 accessed by the present invention asset locator software may be distributed over multiple devices on network 10.

The present invention asset locator 12 as embodied in computer 15 provides a mechanism for locating resources on network 10 since each resource (asset) 20, 25, 30, 35, 40, 45, 50, 55, 60, 65, 70 may be located at a completely different location relative to each other resource on the network. For example, in a typical large business enterprise, server 20 may be located on a first floor in a first office structure, and server 25 may be located on a second floor in the same structure or in a completely separate second office structure. Similarly, each computer 30, 35 and each peripheral 50, 60 may be located on the first floor and served by server 20, whereas each computer 40, 45 and peripheral 55, 65 and 70 may be located on the second floor or in the separate office structure. To this regard, Area "A" and Area "B" are shown to suggest two separate locales for the respective devices on network 10 in this example. Asset locator computer 15 is depicted as not being in either locale as it may be located in Area "A" or "B" or somewhere else. Obviously, however, this configuration is merely exemplary and is not intended to imply any limitations to the variations that may be utilized under principles of the present invention. Clearly, many geographically differentiated configurations and device placement locations are feasible for computing resources in networked environments as conventional in the art.

Importantly, the present invention asset locator 12 provides a means for locating such resources, and especially for locating peripheral devices such as printers 50, 55, and 70, fax 60, and copier 65 in environments where distributed locations of the devices may be diverse. Generally speaking, and as will be described more fully herein, asset locator 12 determines an asset's location by identifying user information pertaining to a user or users that use or have used the asset, and then determining reference locations of the users based on the user information. The collection of reference locations of the users suggests the location of the asset because, typically, an asset is located near the user or users that use the asset. For example, a user typically submits print jobs to a network printer that is physically located near to or in the general area of the user.

Figure 2:
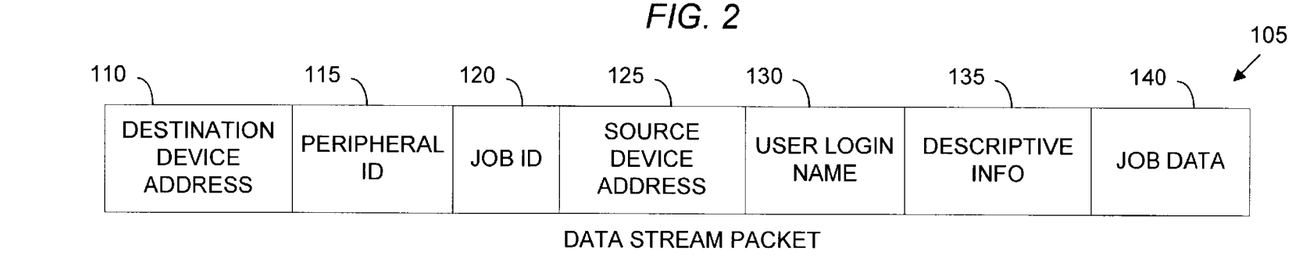
FIG. 2 is a block diagram of a data stream packet.

Referring now to FIG. 2, a block diagram depicts an exemplary data stream packet 105 as transmitted via network 10 from a source device to a destination device coupled to the network. In other words, data stream packet 105 represents data that may be associated with a job transmitted from any of the servers 20, 25, computers 30, 35, 40, 45, fax machine 60 or copier 65 over network 10 to any other device on the network. For example, when a job is sent from computer 35 to printer 50 or fax 60 via server 20 over network 10, data stream packet 105 represents the job transmitted. To this regard, data stream packet 105 may include the following fields:

destination device address 110 which identifies the network address of the receiving device;

peripheral identification information 115 which identifies the peripheral device to which a job is ultimately directed if the peripheral is served (hosted) by the destination device;

job identification information 120 which identifies this particular job, for example, for queuing and spooling purposes either on the destination peripheral device (if not served by a server device), or on a server device (if the destination peripheral device is served by a server);

source device address 125 which identifies the network address of the sending device;

user login name 130 which identifies a login name of a user sending the job;

descriptive information 135 which is a generic field capable of including any data defined by the user, or a system or network administrator, to accompany the job submitted, such as user location information;

job data 140 which is the actual print job data to be imaged, printed, or transmitted on, to, or from the respective peripheral device.

It should be noted that, typically, not all of the fields shown in data stream packet 105 of FIG. 2 are included in a given network protocol data stream packet. In fact, most conventional network protocols do not include all of the fields described in data stream packet 105. Thus, FIG. 2 is merely representative of what fields may exist in a data stream packet as conventional in the art. Additionally, it is understood that other additional fields may be included and/or field labels may vary from those described in data stream packet 105.

Once data stream packet 105 arrives at its appropriate destination device, whether the destination is a server 20, 25 or peripheral device 50, 55, 60, 65 or 70, the packet is stored on the destination device, i.e., in memory or on disk, in a similar or modified form relative to FIG. 2 and as conventional in the art. Specifically, certain data fields of data stream packet 105 may not be stored on the destination device if they are not needed on the device. For example, the destination device address field 110 may be deleted in order to reduce storage consumption. Thus, again, data stream packet 105 is shown to exemplify what fields may be stored on any destination device as conventional in the art, but not all fields need be stored and/or other fields not shown may also be stored.

Importantly, whether data stream packet 105 is present (in transit) on network 10 or stored in a device coupled to the network, asset locator 12 accesses one or more of these fields to determine the location of an asset under principles of the present invention. Specifically, for example, asset locator 12 captures source device address 125 to determine the device from whence the job originated. Subsequently, asset locator 12 cross references that captured source device address in a database 14 that includes the source device address and/or a user login name associated with that address, and a description of the physical (geographical) location of that user or source device. Database 14 is stored on asset locator computer 15 or, alternatively, on any other networked device and, preferably, is a relational type database. Importantly, under principles of the invention, the description of the physical location of the user of a source device defines not only the location for that source device but strongly suggests a general location of the peripheral asset for which the job was intended because, typically, the peripheral asset is located near to or in the same general area of the source device. This is particularly true for peripheral devices 50, 55, 60, 65 and 70 relative to respective source computers 30, 35, 40 and 45. In other words, most networked users are physically located near or in the same general vicinity of the peripheral devices that they use or have used.

Figure 3:
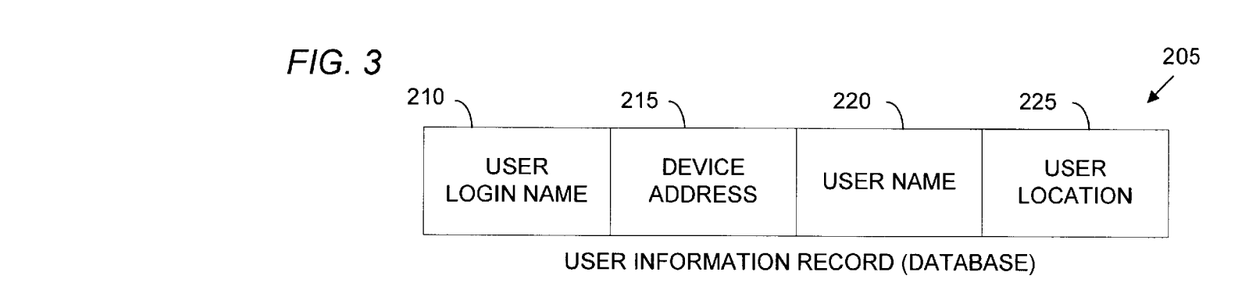
FIG. 3 is a block diagram of a user information database record.

Referring now to FIG. 3, a block diagram depicts a database record 205 for providing and enabling cross referencing of user information and device information associated with network 10. Record 205 is stored in database 14 on asset locator computer 15 (i.e., in memory, on disk, or some other storage medium) as conventional in the art. Alternatively, database 14, which embodies record (or records) 205, is distributed across multiple devices or storage media over network 10.

Database 14 embodies multiple records 205, with each record identifying a unique user associated with network 10. Importantly, database 14 is created and maintained to include user information pertinent to the present invention. Specifically, for example, database record 205 includes either: (1) a user's login name information 210 or the user's login (source) device network address information 215, and (2) the user's name information 220 and physical location information 225. Advantageously, database 14 may be a database created or kept by a business for tracking personnel, regardless of asset locator 12. Additionally, database 14 may be spread over several existing databases where each individual database has a common key, typically the user name (i.e., employee) or similar identification, to allow records in one database to be associated with records in another database. To this regard, asset locator 12 simply taps into the already existing database 14 for referencing the needed information.

Pursuant to the workings of asset locator 12, when a user login name 130 or source device address 125 is captured from data stream packet 105, that information is cross referenced, respectively, in database 14 with the user login name 210 and/or device address 215 fields of records 205 until a match is found. Once a match is found, that user's (or employee's) real name 220 and physical location 225 are identified from the matched record 205. Again, it should be noted here that although FIG. 3 depicts record 205 as having each of the identified fields 210, 215, 220 and 225 included therein, it is equally feasible to separate out certain fields into another record, for example, in a different table, either in the same database or in a separate database, so long as the records are cross referenced with a key field as conventional in the art.

User name 220 includes information sufficient to identify a person (or employee) as the case may be. Location information 225 includes any data sufficient to satisfy the requirement to locate the person identified in the user name field 220, dependent upon the particulars of any given physical environment and/or network environment in which asset locator 12 is utilized. For example, in a large business complex, location information 225 may include a building reference, a floor or level, and/or another location criteria such as a directional metric (i.e., North, South, East, or West) or a specifically labeled reference point for the complex. To clarify, in a multi-building complex wherein multiple levels exist in the buildings and structural support columns throughout the buildings are marked with location labels, location information 225 may simply be 3UR6, meaning building three (3), upper level (U), column label R6. However, this is merely exemplary and it is understood that there are numerous methods of defining or coding a user's location information. Importantly, however, once asset locator 12 identifies the user location 225 from a respectively matched record 205, the location of the asset being tracked may also be determined. Namely, the location of the user strongly suggests the location of the asset because the asset is typically located near the user (or users) that use the asset. Asset locator 12 thus reports this location 225 or, significantly, further refines the actual probable location of the asset by identifying other users that are using and/or have used the asset as will be further described herein.

Figure 4:
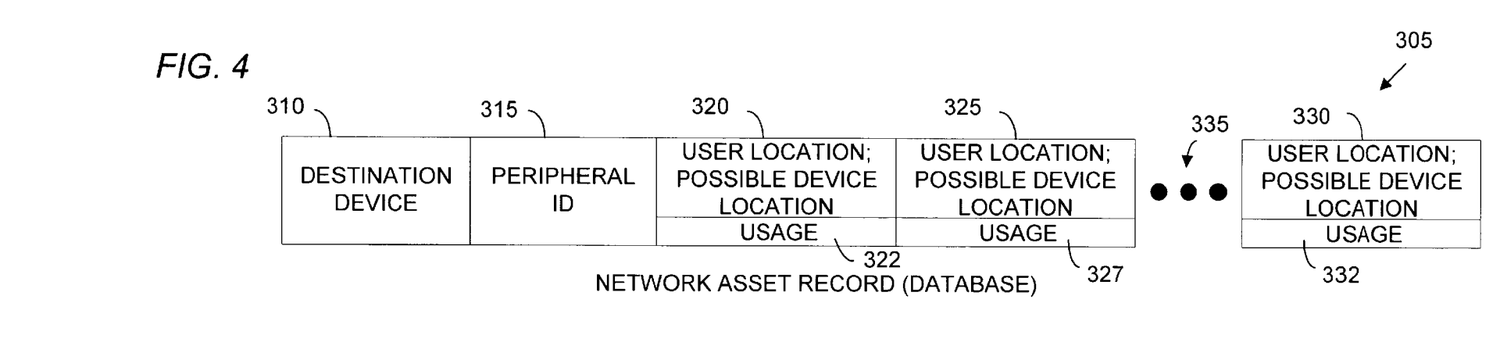
FIG. 4 is a block diagram of a network asset location database record.

Thus, referring now to FIG. 4, a block diagram depicts a database record 305 for identifying an asset's physical location. Network asset record 305 is maintained and stored in a database within asset locator 12, or within a separate database such as database 14, either in memory and/or in non-volatile storage on computer 15, or on another network device or plurality of devices. Under principles of the invention, asset locator 12 creates and maintains a separate record 305 for every asset 20, 25, 30, 35, 40, 45, 50, 55, 60, 65 and 70 on network 10.

Network asset record 305 includes information fields such as destination device address field 310 and/or peripheral ID field 315 for identifying the particular device on network 10 with which record 305 is associated. Importantly, record 305 further includes one or more user location fields 320, 325, 330, also referred to as "possible device location" fields, for ultimately identifying a probable physical location of the device identified by the record. Each user location field 320, 325, 330 identifies a known location of a unique user that has used this device. Thus, if three users have used this device, the location associated with each of those users as extracted from the user location field 225 of user information record 205 is stored in a respective field 320, 325, 330. When other users are detected as using this device of record 305, then those respective user locations are similarly added to record 305. In a preferred embodiment, fields 320, 325, 330 are dynamically allocated for each new user location encountered, although a fixed length record may similarly be employed. Ellipses 335 illustrate that there may be more user location fields, similar to 320, 325 and 330, that become part of record 305 as needed and/or as dynamically allocated.

Again, the purpose of user location fields 320, 325, 330 is to enable a determination of a probable location of the device from a collection of possible locations. In other words, given a plurality of known user locations associated with a device record 305, the probable physical location of the device becomes more ascertainable through conventional statistical analysis, plotting techniques, and/or other extrapolation measures. To this regard, in a preferred embodiment, each user location field 320, 325, 330 also includes (or references) an associated "usage" field or parameter 322, 327, 332, respectively, that identifies how many times or what percentage of total times a given user (identified by that user location 320, 325, 330) has referenced the given device. In this context, the probable physical location of the device may be more accurately identified. For example, a collective set of users that use a peripheral device the most are probably located nearest to that device.

Figure 5:
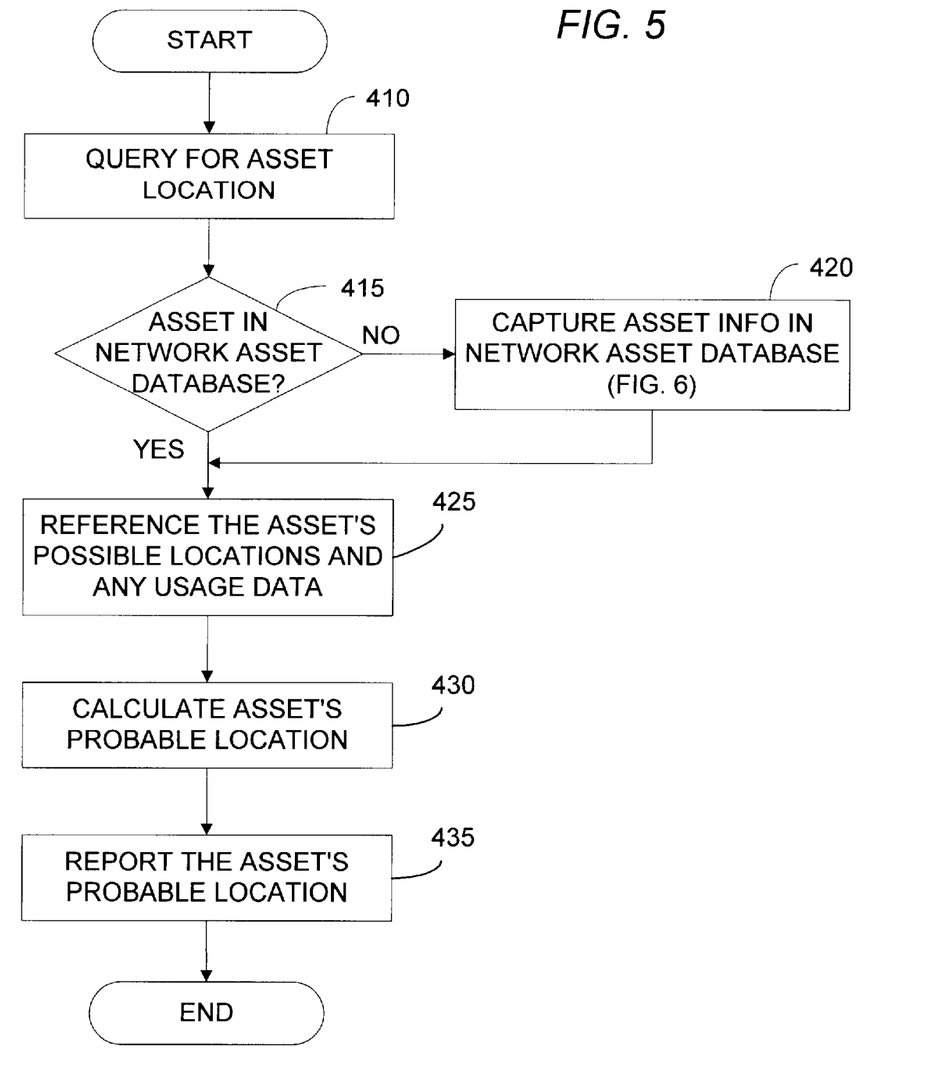
FIGS. 5–6 are flow charts depicting a preferred method of the present invention.
Figure 6:
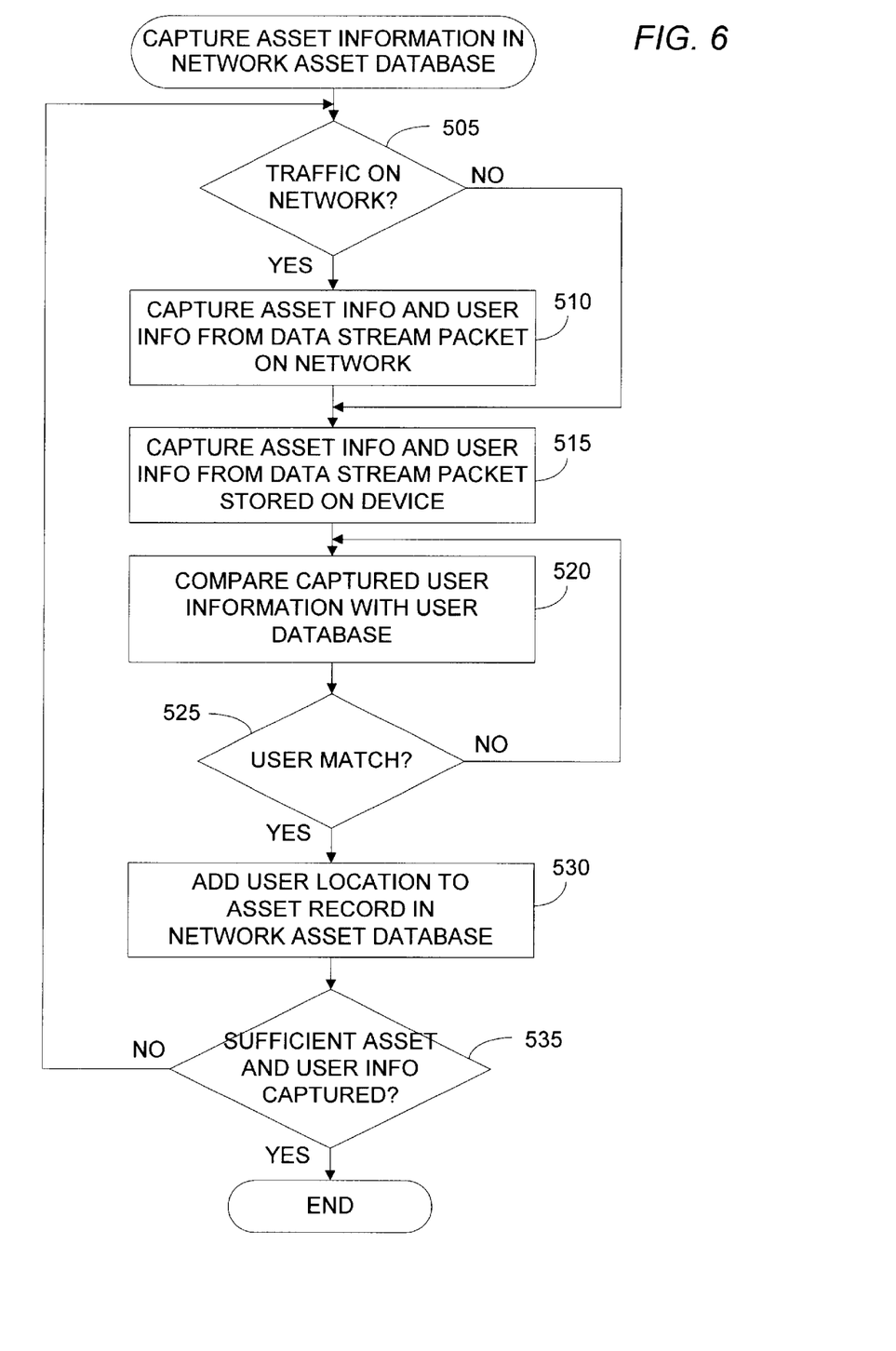

Referring now to FIG. 5 and FIG. 6, two flow charts depict a preferred method implemented by asset locator 12 for locating assets 20, 25, 30, 35, 40, 45, 50, 55, 60, 65 and 70 associated with a network 10. In a preferred embodiment, this method is implemented (executed) utilizing a front end or user interface process shown in FIG. 5 for querying, calculating and/or reporting asset locations. Additionally, a core engine or information gathering process shown in FIG. 6, which is executed as a background process on computer 15 in a preferred embodiment, provides the basic information gathering and device database building of the present invention. However, it is obvious that other variations of the methods depicted in FIGS. 5–6 are similarly feasible.

So, referring to FIG. 5, once a query for an asset location is initiated 410, if a network asset record 305 is already updated 415 in database 14, then the asset's possible physical locations 320, 325, 330 and usage data 322, 327, 332 are referenced 425. Next, the probable location of the asset is calculated 430. This method may be as simple as selecting the possible device location field 320 with the highest usage number 322, or as complicated as statistically calculating and plotting each of the possible device locations and usage numbers to determine a most probable location of the asset. In either case, once the calculation is complete, the asset's probable location is reported 435. In short, the calculated probable location 430, 435 is simply a determination based on user usage of the device because the device is typically located near to or in the general area of the user or users'locations. Asset locator 12 reports the probable asset's location by displaying the location on computer 15, by printing it, by storing it, or by otherwise manipulating the reported data as needed to enable tracking of that device.

On the other hand, if upon a query 410 it is determined that an asset is not yet in the network asset database 415 (i.e., a network asset record 305 needs to be created or updated), then that asset's information is captured 420 into a network asset record 305 as defined more completely in FIG. 6.

Thus, referring now to FIG. 6, if it is determined 505 that there is traffic on the network 10 (i.e., data stream packets 105 are being transmitted), then capture 510 the appropriate asset information and user information from the data stream packets 105. The information for determining whether this is an asset being tracked is gathered from the destination device address field 110 or peripheral ID field 115. The relevant user information includes data such as found in source device field 125, user login name 130, descriptive information 135, or even job data 140 of data stream packet 105.

After any (or sufficient) network data stream packets 105 are captured, or if indeed there is no traffic on the network 505, then capture 515 any relevant asset information and user information from the data stream packets 105 stored on destination devices 20, 25, 30, 35, 40, 45, 50, 55 and 60. Since the destination device addresses are known on network 10, asset locator 12 polls/accesses each device to retrieve any data stream packets 105 stored thereon, either in non-volatile or volatile memory.

However, copier 65 and printer 70 are only indirectly coupled to network 10 via a direct coupling to server 25 and computer 40 respectively. Thus, any device or user information concerning copier 65 and printer 70 is extracted only from server 25 and computer 40 respectively. For example, data stream packets 105 stored on server 25 and computer 40 will include peripheral ID information 115 regarding copier 65 and printer 70 respectively for jobs that are associated with those devices. Accordingly, where a peripheral device 65 or 70 is not directly connected to the network, the location of the host 25, 40 for that device strongly suggests the location of the peripheral. This is because the peripheral is generally coupled to the host using a cable or other wireless coupling technology that typically mandates that the peripheral be located within a short distance of the host. Consequently, upon detecting data stream packets 105 on server 25 that identify copier 65 therein, it strongly suggests that copier 25 is located near server 25. Similarly, upon detecting data stream packets 105 on computer 40 that identify printer 70 therein, it strongly suggests that printer 70 is located near computer 40.

Next, if this is an asset being tracked (i.e., if the destination address 110, peripheral ID 115 or source address 125 matches the predetermined asset description for the asset being tracked, either as defined by query 410 in FIG. 5 or as defined by a master list of devices), then compare 520 the user information 125, 130, 135 captured from data stream packet 105 with records 205 in the user information database 14. If the captured user information matches 525 a record 205 in database 14, then the user location 225 is referenced and added 530 to a user location 320, 325, 330 in the network asset record 305 for the given device. If the user location (i.e., possible device location) already exits in record 305, then the respective usage counter 322, 327, 332 is simply incremented or updated accordingly.

Subsequently, if insufficient user information has been captured for a given asset 535, or if there are more assets to be accessed (for example, if the process is executing in the background and not merely in response to a specific user query as suggested by FIG. 5), then the process control loops to continue gathering further information 535, 505, 510, 515, etc. The parameters for determining when sufficient user information is gathered for any given device are denoted simply by system or design choice. For example, a threshold may be set for the number of possible device location fields 320, 325, 330 or usage counts established. Or, a threshold may be set for the number of times the looping process 535, 505 is executed. In any case, once sufficient asset and user information is captured 535, then the network asset record 305 is complete for the given asset (i.e., queried from FIG. 5) and/or for all known assets on network 10 (i.e., in the event of constant background process execution). Obviously, however, further monitoring, capturing, and/or updating of data for the assets on network 10 will continue to occur as needed with the method of FIG. 6 executing as a background process. To this regard, time stamps (not shown) may also be associated with the user location fields 320, 325, 330 or usage fields 322, 327, 332 of network asset records 305. Time stamp fields allow for a more precise updating of the records, such as for tracking user information of a device based on a most-recently-used status.

Finally, what has been described above is a means and method for locating assets in a network environment. It will be obvious to one of ordinary skill in the art that the present invention is easily implemented utilizing any of a variety of software tools, firmware and/or hardware components existing in the art. Moreover, while the present invention has been described by reference to specific embodiments, it will be apparent that other alternative embodiments and methods of implementation or modification may be employed without departing from the true spirit and scope of the invention.

What is claimed is:

1. A method of locating a first device on a network, comprising:
   (a) identifying user information from a data stream transmitted on the network to the first device and originating from a source device and pertaining to at least one user that uses or has used the first device, the source device being a second device;
   (b) determining a reference location of the at least one user based on the user information identified; and,
   (c) determining a location of the first device based on the reference location of the at least one user.

2. The method of claim 1 wherein the first device is a host device, a peripheral device, or other computing device.

3. A method of locating a first device on a network, comprising:
   (a) identifying user information originating from a source device and pertaining to at least one user that uses or has used the first device, the source device being a second device, and wherein the user information includes a network address of the source device which transmitted data to the first device either directly or indirectly;
   (b) determining a reference location of the at least one user based on the user information identified; and,
   (c) determining a location of the first device based on the reference location of the at least one user.

4. A method of locating a first device on a network, comprising:
   (a) identifying user information originating from a source device and pertaining to at least one user that uses or has used the first device, the source device being a second device, and wherein the user information includes a login name of the at least one user as associated with the source device which transmitted data to the first device either directly or indirectly;
   (b) determining a reference location of the at least one user based on the user information identified; and,
   (c) determining a location of the first device based on the reference location of the at least one user.

5. A method of locating a first device on a network, comprising:
   (a) identifying user information originating from a source device and pertaining to at least one user that uses or has used the first device, the source device being a second device, and wherein the user information includes location identification indicia for the source device which transmitted data to the first device either directly or indirectly;
   (b) determining a reference location of the at least one user based on the user information identified; and,
   (c) determining a location of the first device based on the reference location of the at least one user.

6. A method of locating a first device on a network, comprising:
   (a) identifying user information originating from a source device and pertaining to at least one user that uses or has used the first device, the source device being a second device;
   (b) determining a reference location of the at least one user based on the user information identified, including cross referencing the user information with a reference location database that includes the reference location of the at least one user; and,
   (c) determining a location of the first device based on the reference location of the at least one user.

7. A method of locating a first device on a network, comprising:
   (a) identifying user information originating from a plurality of source devices separate from the first device, the user information pertaining to a respective plurality of users that use or have used the first device;
   (b) determining a respective reference location for each of the plurality of users based on the user information identified; and,
   (c) determining a location of the first device based on a collective of the reference locations for the plurality of users.

8. A computer readable medium having computer-executable instructions for locating a first device on a network, the instructions configured to:
   (a) identify user information from a data stream transmitted on the network to the first device and originating from a source device and pertaining to at least one user that uses or has used the first device, the source device being a second device;
   (b) determine a reference location of the at least one user based on the user information identified; and,
   (c) determine a location of the first device based on the reference location of the at least one user.

9. An apparatus for locating a first device on a network, comprising:
   (a) means for identifying user information from a data stream transmitted on the network to the first device and originating from a source device and pertaining to at least one user that uses or has used the first device, the source device being a second device;
   (b) means for determining a reference location of the at least one user based on the user information; and,
   (c) means for determining a location of the first device based on the reference location of the at least one user.

10. The apparatus of claim 9 wherein the first device is a host device, a peripheral device, or other computing device.

11. An apparatus for locating a first device on a network, comprising:
   (a) means for identifying user information originating from a source device and pertaining to at least one user that uses or has used the first device, the source device being a second device, and wherein the user information includes a network address of the source device which transmitted data to the first device either directly or indirectly;
   (b) means for determining a reference location of the at least one user based on the user information; and,
   (c) means for determining a location of the first device based on the reference location of the at least one user.

12. An apparatus for locating a first device on a network, comprising:
   (a) means for identifying user information originating from a source device and pertaining to at least one user that uses or has used the first device, the source device being a second device, and wherein the user information includes a login name of the at least one user as associated with the source device which transmitted data to the flrst device either directly or indirectly;
   (b) means for determining a reference location of the at least one user based on the user Information; and,
   (c) means for determining a location of the first device based on the reference location of the at least one user.

13. An apparatus for locating a first device on a network, comprising:

(a) means for identifying user information originating from a source device and pertaining to at least one user that uses or has used the first device, the source device being a second device, and wherein the user information includes location identification indicia for the source device which transmitted data to the first device either directly or indirectly;

(b) means for determining a reference location of the at least one user based on the user information; and, (c) means for determining a location of the first device based on the reference location of the at least one user.

14. An apparatus for locating a first device on a network, comprising:

(a) means for identifying a plurality of users' information originating from a respective plurality of source devices, the user' information pertaining to a respective plurality of users that use or have used the first device;

(b) means for determining a respective reference location for each of the plurality of users based on the user information identified; and, (c) means for determining a location of the first device based on a collective of the reference locations for the plurality of users.

* * * * *